(12) United States Patent
Shimizu et al.

(10) Patent No.: US 11,548,160 B2
(45) Date of Patent: Jan. 10, 2023

(54) THREE-DIMENSIONAL MEASURING DEVICE, CONTROLLER, AND ROBOT SYSTEM

(71) Applicant: Seiko Epson Corporation, Tokyo (JP)

(72) Inventors: Takeshi Shimizu, Chino (JP); Makiko Hino, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 843 days.

(21) Appl. No.: 16/451,374

(22) Filed: Jun. 25, 2019

(65) Prior Publication Data

US 2019/0389068 A1 Dec. 26, 2019

(30) Foreign Application Priority Data

Jun. 26, 2018 (JP) .............................. JP2018-120988

(51) Int. Cl.
| | |
|---|---|
| *G01B 11/25* | (2006.01) |
| *B25J 9/16* | (2006.01) |
| *B25J 11/00* | (2006.01) |
| *B23K 26/08* | (2014.01) |
| *B25J 19/02* | (2006.01) |

(52) U.S. Cl.
CPC ......... *B25J 9/1697* (2013.01); *B23K 26/0884* (2013.01); *B25J 11/005* (2013.01); *B25J 19/022* (2013.01); *G01B 11/254* (2013.01); *G05B 2219/37555* (2013.01); *G05B 2219/39001* (2013.01)

(58) Field of Classification Search
CPC ...... B25J 9/1697; B25J 11/005; B25J 19/022; B23K 26/0884; G01B 11/254; G05B 2219/37555; G05B 2219/39001
See application file for complete search history.

(56) References Cited

U.S. PATENT DOCUMENTS 8,145,446 B2 * 3/2012 Atwell .................. B25J 9/1692
33/503
8,572,858 B2 * 11/2013 Raab ..................... B25J 9/1692
33/503

(Continued)

FOREIGN PATENT DOCUMENTS

| CN | 103302666 A | 9/2013 |
|---|---|---|
| CN | 103620341 A | 3/2014 |

(Continued)

*Primary Examiner* — Yaritza Guadalupe-McCall
(74) *Attorney, Agent, or Firm* — Yu Gang

(57) ABSTRACT

A three-dimensional measuring device is a three-dimensional measuring device that performs three-dimensional measurement of an object using a laser beam. The three-dimensional measuring device includes a laser emitter disposed in a movable section of a robot and configured to irradiate a region including the object with the laser beam, a laser emission controller configured to control driving of the laser emitter, an image capturing device configured to image the object, on which the laser beam is irradiated, and acquire image data, and a point cloud generator configured to generate, based on the image data, three-dimensional point cloud of the region including the object. The laser emitter includes a laser beam source and a diffuser configured to diffuse the laser beam emitted from the laser beam source.

13 Claims, 8 Drawing Sheets

(56) References Cited

U.S. PATENT DOCUMENTS

| | | | |
|---|---|---|---|
| 8,595,948 B2* | 12/2013 | Raab | G01B 21/042 33/503 |
| 8,607,467 B2* | 12/2013 | Raab | G01B 5/008 33/503 |
| 8,931,182 B2* | 1/2015 | Raab | B25J 9/1692 33/503 |
| 10,837,759 B2* | 11/2020 | Wakabayashi | G01B 11/28 |
| 11,135,724 B2* | 10/2021 | Harada | B25J 19/023 |
| 11,192,204 B2* | 12/2021 | Aoki | B23K 26/032 |
| 11,235,469 B2* | 2/2022 | Horiguchi | B25J 19/022 |
| 11,312,029 B2* | 4/2022 | Wakabayashi | B25J 19/022 |
| 2018/0221990 A1* | 8/2018 | Aoki | G02B 26/10 |
| 2018/0299260 A1* | 10/2018 | Nakamura | B23K 26/032 |
| 2019/0389065 A1* | 12/2019 | Horiguchi | B25J 19/023 |
| 2019/0389068 A1* | 12/2019 | Shimizu | B23K 26/0884 |
| 2019/0390952 A1* | 12/2019 | Wakabayashi | B25J 9/1674 |
| 2020/0122332 A1* | 4/2020 | Harada | B25J 9/1692 |
| 2020/0147805 A1* | 5/2020 | Takahashi | B25J 9/1674 |
| 2020/0269448 A1* | 8/2020 | Ooba | B25J 9/1697 |

FOREIGN PATENT DOCUMENTS

| | | |
|---|---|---|
| CN | 107991687 A | 5/2018 |
| JP | H08132373 A | 5/1996 |
| JP | H11-144161 A | 5/1999 |
| JP | 2004-333369 A | 11/2004 |

\* cited by examiner

THREE-DIMENSIONAL MEASURING DEVICE, CONTROLLER, AND ROBOT SYSTEM

The present application is based on, and claims priority from, JP Application Serial Number 2018-120988, filed Jun. 26, 2018, the disclosure of which is hereby incorporated by reference herein in its entirety.

BACKGROUND

1. Technical Field

The present disclosure relates to a three-dimensional measuring device, a controller, and a robot system.

2. Related Art

JP-A-2004-333369 (Patent Literature 1) describes an articulated robot mounted with a three-dimensional shape measuring device. The three-dimensional shape measuring device mounted on the articulated robot includes a laser beam irradiator for measurement configured to scan a laser beam for measurement toward an object to thereby project a pattern on the object and an optical receiver configured to acquire an image of the object on which the pattern is projected. The three-dimensional shape measuring device is configured to perform three-dimensional measurement of the object based on the image acquired by the optical receiver.

In such a configuration, the three-dimensional shape measuring device is provided in an arm of the articulated robot. Therefore, an emitting direction of the laser beam for measurement changes according to a direction of the arm. Further, when the laser beam for measurement is continuously irradiated toward one point without being scanned or diffused, an energy amount per unit area increases. Therefore, when a person is present on an optical path of the laser beam for measurement, the laser beam for measurement is likely to affect the person.

SUMMARY

A three-dimensional measuring device according to an aspect of the present disclosure is a three-dimensional measuring device that performs three-dimensional measurement of an object using a laser beam. The three-dimensional measuring device includes: a laser emitter disposed in a movable section of a robot and configured to irradiate a region including the object with the laser beam; a laser emission controller configured to control driving of the laser emitter; an image capturing device configured to image the object, on which the laser beam is irradiated, and acquire image data; and a point cloud generator configured to generate, based on the image data, three-dimensional point cloud of the region including the object. The laser emitter includes: a laser beam source; and a diffuser configured to diffuse the laser beam emitted from the laser beam source.

DESCRIPTION OF EXEMPLARY EMBODIMENTS

A three-dimensional measuring device, a controller, and a robot system according to the present disclosure are explained in detail below based on embodiments shown in the accompanying drawings.

First Embodiment

Figure 1:
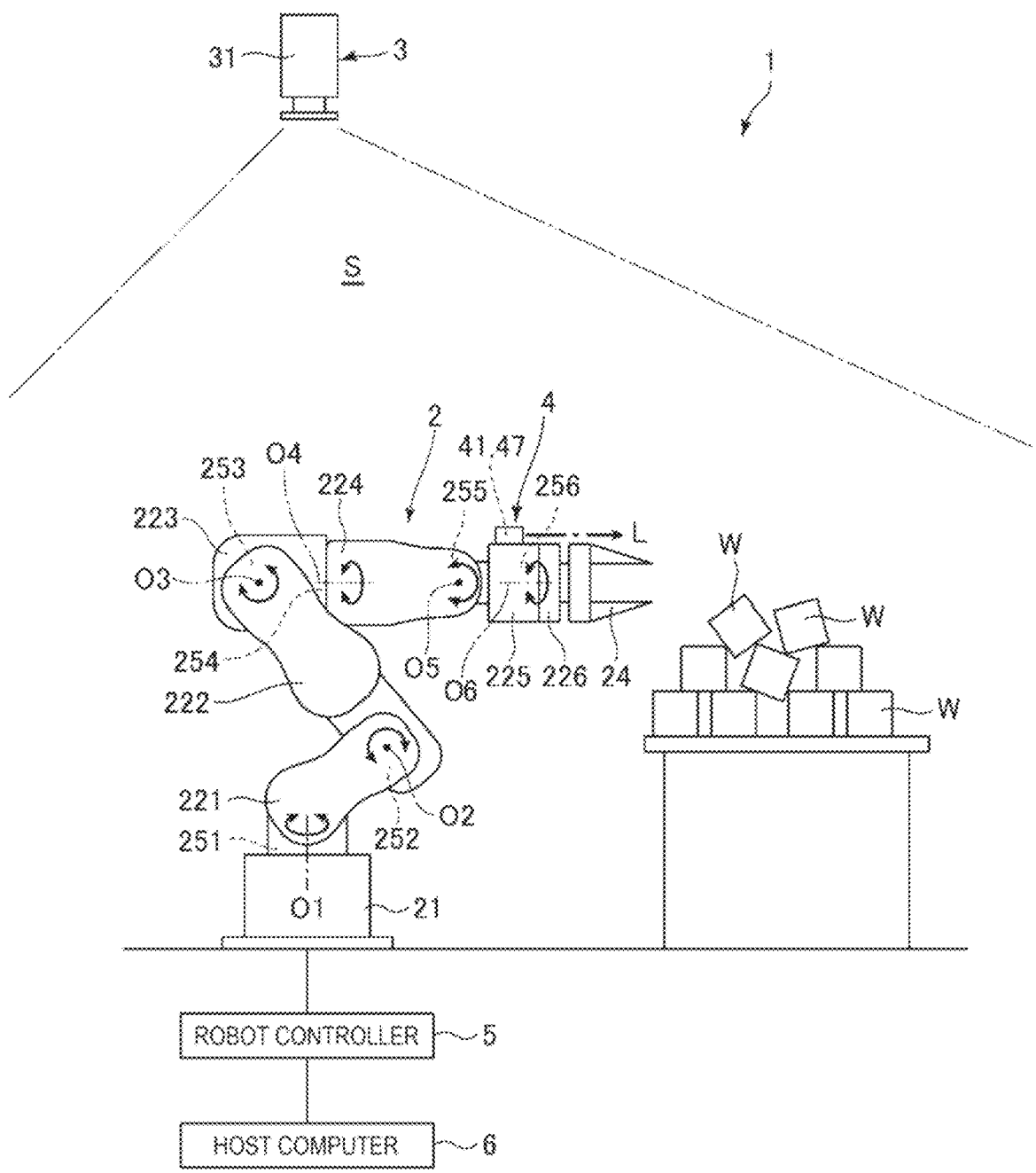
FIG. 1 is a diagram showing an overall configuration of a robot system according to a first embodiment of the present disclosure.
Figure 2:
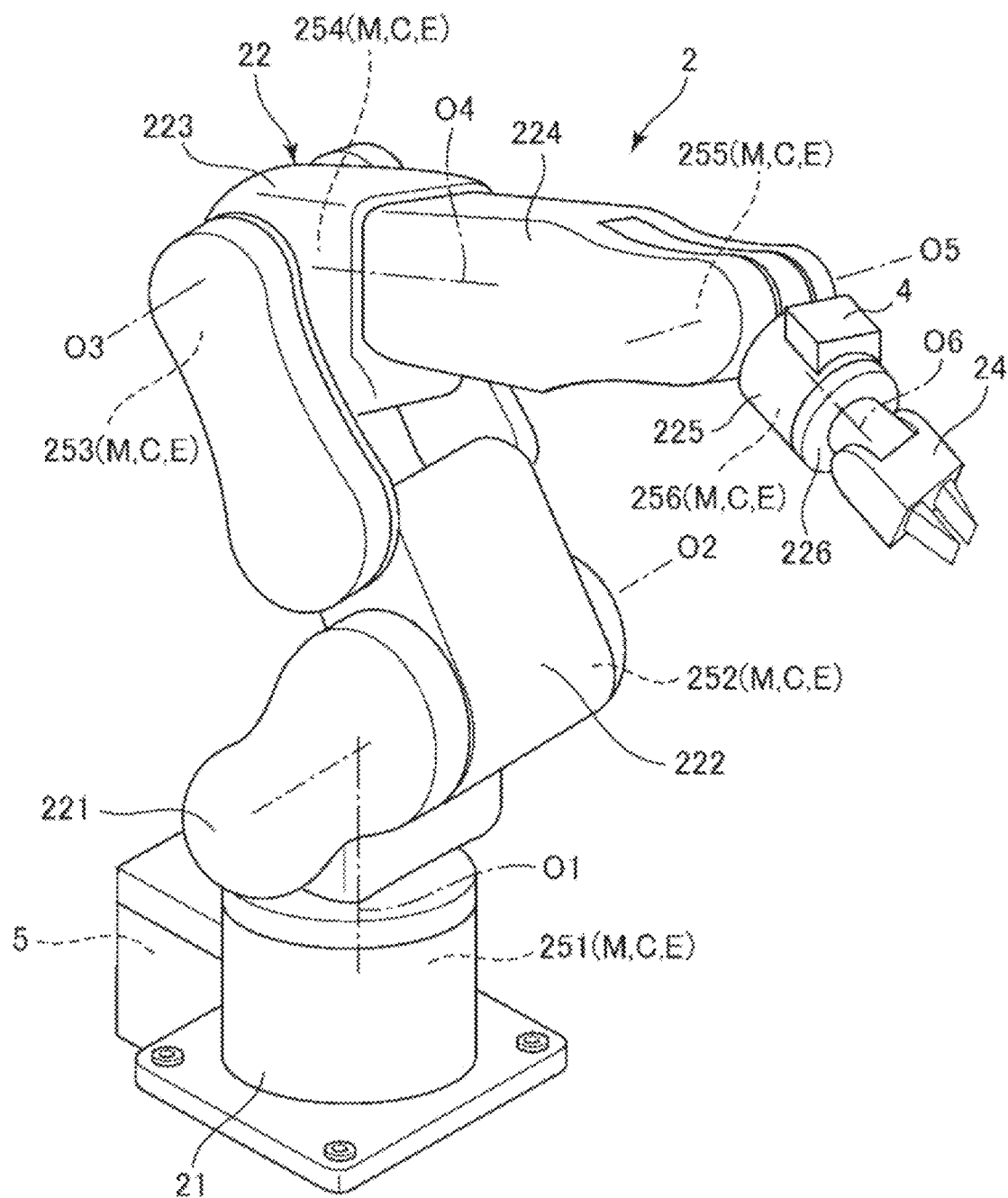
FIG. 2 is a perspective view showing a robot.
Figure 3:
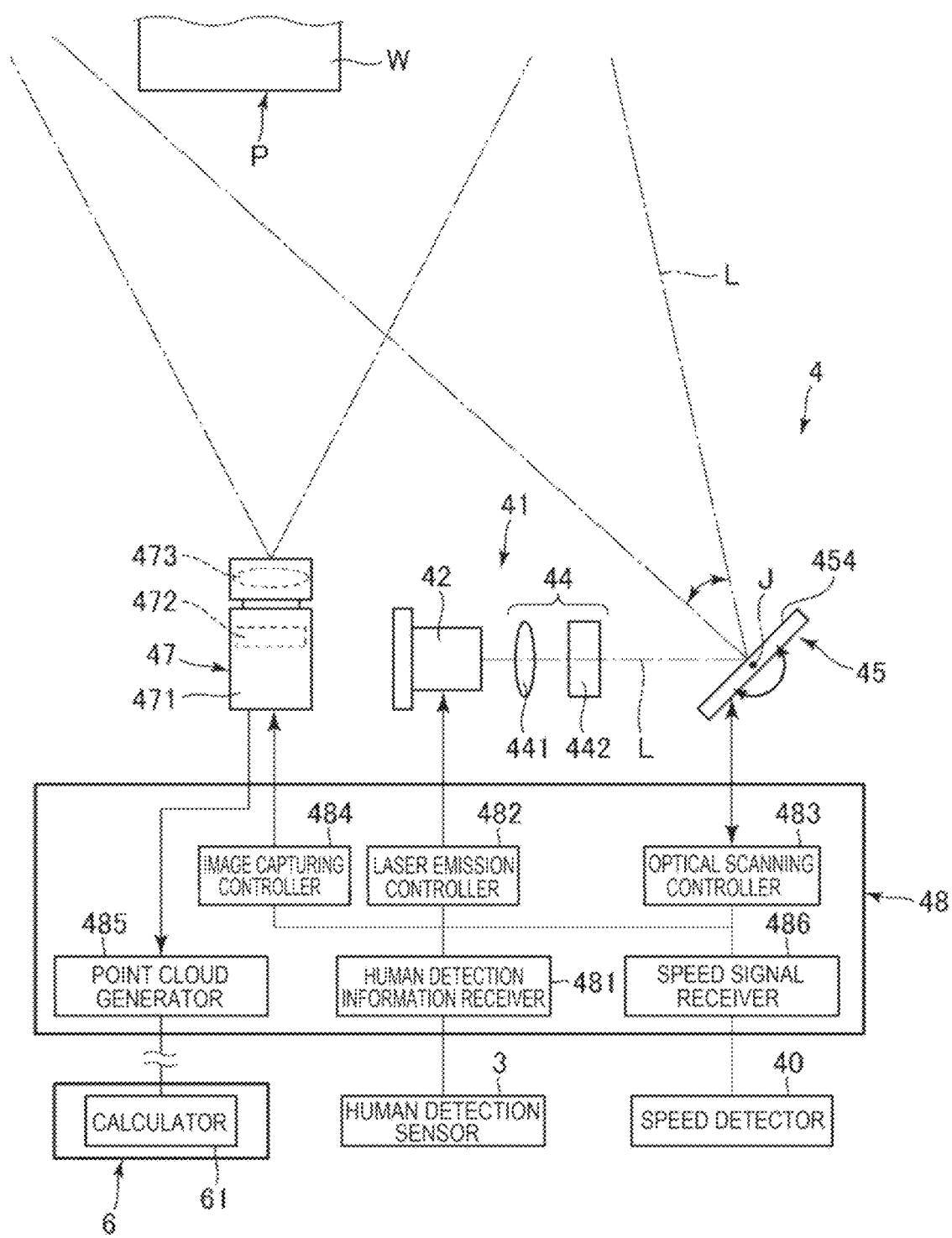
FIG. 3 is a diagram showing an overall configuration of a three-dimensional measuring device.
Figure 4:
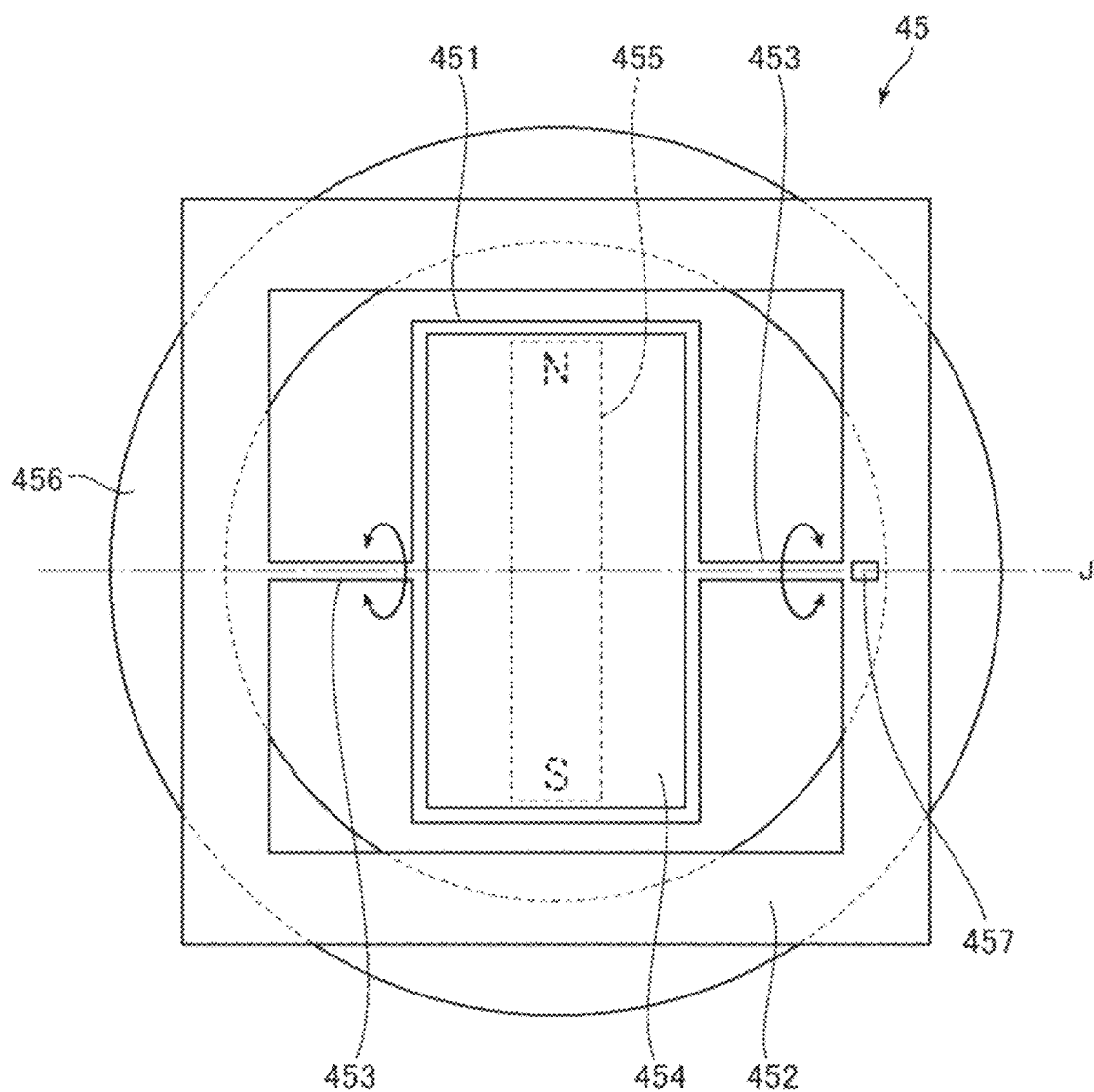
FIG. 4 is a plan view showing an optical scanner included in the three-dimensional measuring device shown in FIG. 3.
Figure 5:
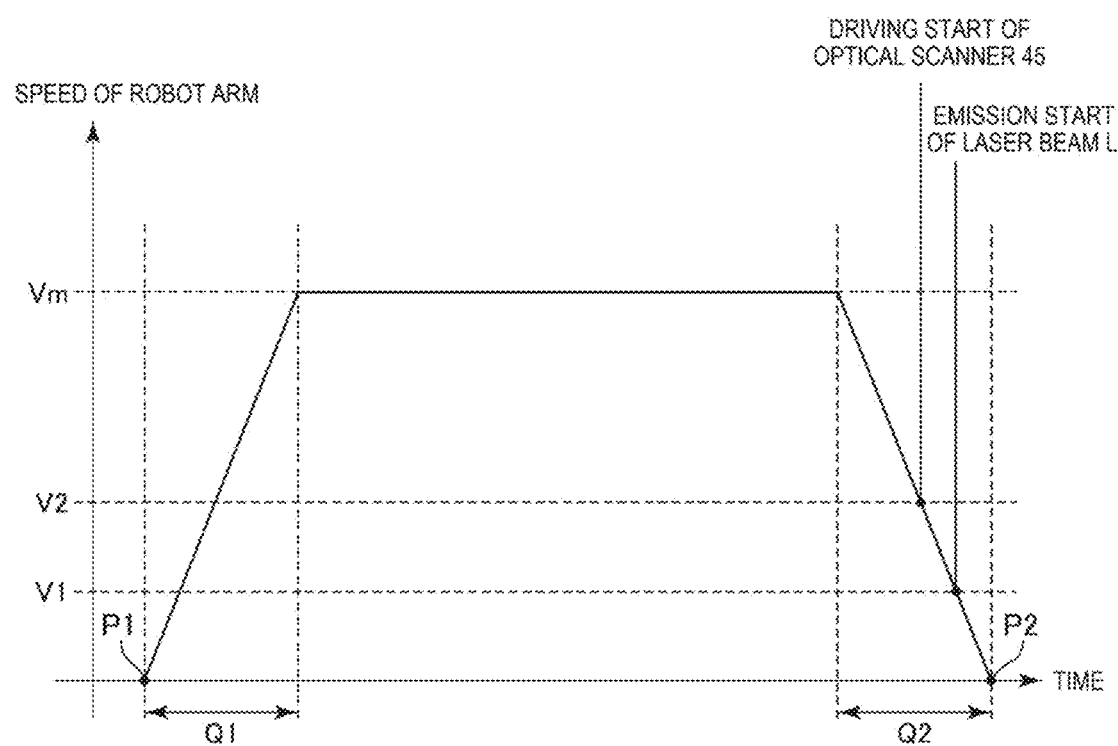
FIG. 5 is a graph showing moving speed of a robot arm.
Figure 6:
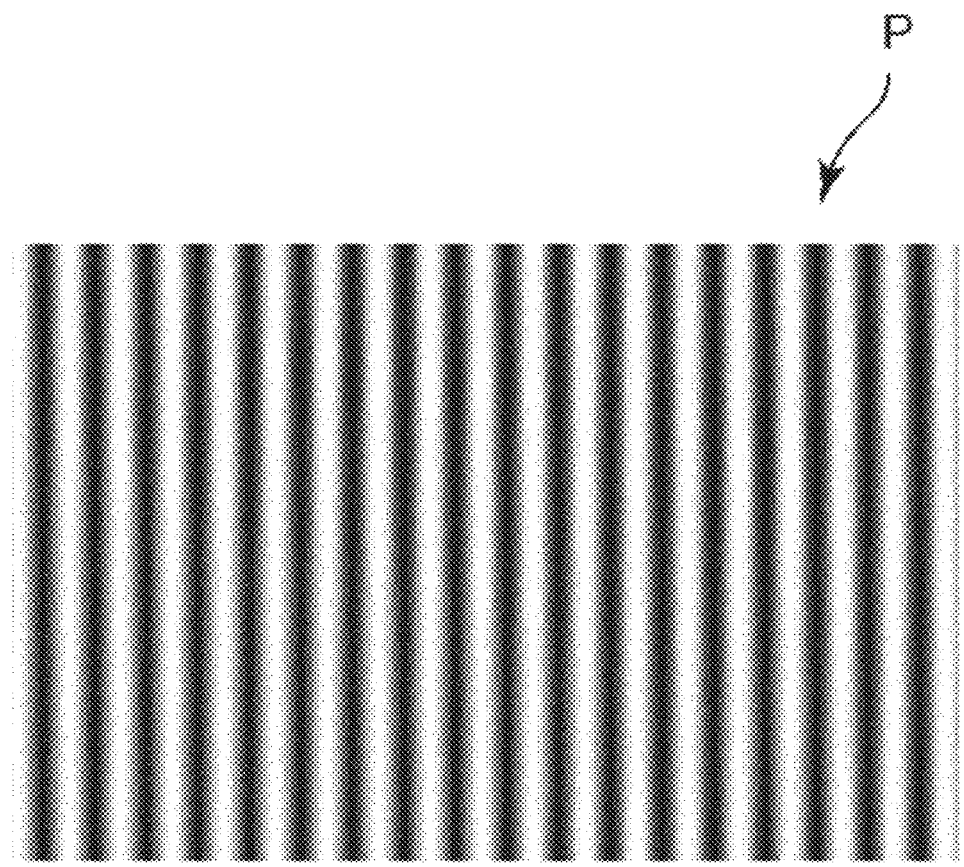
FIG. 6 is a plan view showing a projection pattern projected by a laser emitter.

FIG. 1 is a diagram showing an overall configuration of a robot system according to a first embodiment of the present disclosure. FIG. 2 is a perspective view showing a robot. FIG. 3 is a diagram showing an overall configuration of a three-dimensional measuring device. FIG. 4 is a plan view showing an optical scanner included in the three-dimensional measuring device shown in FIG. 3. FIG. 5 is a graph showing moving speed of a robot arm. FIG. 6 is a plan view showing a projection pattern projected by a laser emitter.

A robot system 1 shown in FIG. 1 is a robot system of a human coexistent type based on the premise that the robot system 1 coexists with a person, that is, the person works around the robot system 1. Therefore, the robot system 1 is configured to detect presence of a person present within a detection range and take measures corresponding to the presence of the person.

The robot system 1 includes a robot 2, a human detection sensor 3 configured to detect a person present in a detection area S (a detection range) set around the robot 2, a three-dimensional measuring device 4 configured to three-dimensionally measure an object W using a laser beam L, a robot controller 5 configured to control driving of the robot 2 based on a measurement result of the three-dimensional measuring device 4, and a host computer 6 capable of communicating with the robot controller 5. When the human detection sensor 3 detects a person in the detection area S, for example, the robot system 1 reduces moving speed of the robot 2 or reduces power of the laser beam L to thereby secure safety of the person present in the detection area S. Such a robot system 1 is explained in detail below.

Robot

The robot 2 is a robot that performs work such as supply, removal, conveyance, and assembly of a precision instrument and components configuring the precision instrument. However, uses of the robot 2 are not particularly limited.

The robot 2 is a six-axis robot. The robot 2 includes, as shown in FIG. 2, a base 21 fixed to a floor or a ceiling and a robot arm 22 (a movable section) movable with respect to the base 21. The robot arm 22 includes a first arm 221 coupled to the base 21 turnably around a first axis O1, a second arm 222 coupled to the first arm 221 turnably around a second axis O2, a third arm 223 coupled to the second arm 222 turnably around a third axis O3, a fourth arm 224 coupled to the third arm 223 turnably around a fourth axis O4, a fifth arm 225 coupled to the fourth arm 224 turnably around a fifth axis O5, and a sixth arm 226 coupled to the fifth arm 225 turnably around a sixth axis O6. A hand coupling section is provided in the sixth arm 226. An end effector 24 corresponding to work to be executed by the robot 2 is attached to the hand coupling section.

The robot 2 includes a first driving device 251 configured to turn the first arm 221 with respect to the base 21, a second driving device 252 configured to turn the second arm 222 with respect to the first arm 221, a third driving device 253 configured to turn the third arm 223 with respect to the second arm 222, a fourth driving device 254 configured to turn the fourth arm 224 with respect to the third arm 223, a fifth driving device 255 configured to turn the fifth arm 225 with respect to the fourth arm 224, and a sixth driving device 256 configured to turn the sixth arm 226 with respect to the fifth arm 225.

The first to sixth driving devices 251 to 256 respectively include, for example, motors M functioning as driving sources, controllers C configured to control driving of the motors M, and encoders E configured to detect rotation amounts of arms corresponding to the first to sixth driving devices 251 to 256. The first to sixth driving devices 251 to 256 are respectively independently controlled by the robot controller 5.

The sections of the robot 2 and the robot controller 5 explained above are enabled to communicate by wire or radio. The communication may be performed via a network such as the Internet. The same applies to communication between the robot controller 5 and the host computer 6 and communication between a controller 48 explained below and the host computer 6.

The robot 2 is not limited to the configuration in this embodiment. For example, the number of arms may be one to five or may be seven or more. For example, a type of the robot 2 may be a SCARA robot or a double-arm robot.

Human Detection Sensor

The human detection sensor 3 detects a person present in the detection area S set around the robot 2 and transmits a result of the detection to the three-dimensional measuring device 4 and the robot controller 5. In the following explanation, information output from the human detection sensor 3 when a person is absent in the detection area S is referred to as "human non-detection signal" as well. Information output from the human detection sensor 3 when the person is present in the detection area S is referred to as "human detection signal" as well.

The configuration of the human detection sensor 3 is not particularly limited as long as such an object can be achieved. As shown in FIG. 1, the human detection sensor 3 in this embodiment is provided above the robot 2. The human detection sensor 3 includes a camera 31 capable of imaging the entire region of the detection area S. The human detection sensor 3 is configured to detect a person present in the detection area S based on image data captured by the camera 31.

However, the disposition of the camera 31 is not limited to a ceiling. The camera 31 may be provided on a wall, may be provided on a movable or stationary stand, or may be provided on a floor. Two or more cameras 31 may be disposed. The camera 31 may be provided in, for example, the robot 2. In this case, a camera 471 explained below may function as the camera 31 as well. Besides, a weight sensor, a laser beam sensor, an infrared sensor, a sensor of a capacitance type, and the like may be used as the human detection sensor 3.

A target of detection by the human detection sensor 3 is not limited to a person and may be any objects that can intrude into the detection area S such as an animal other than the person, a robot other than the robot 2, a mobile body such as an automatic guided vehicle (AGV), and other movable various electronic devices. When these objects are present in the detection area S, the objects may be determined the same as the person or may be distinguished from the person.

Robot Controller

The robot controller 5 receives a position command for the robot 2 from the host computer 6 and respectively independently controls driving of the first to sixth driving devices 251 to 256 to locate the arms 221 to 226 in positions corresponding to the received position command.

The robot controller 5 includes, as a driving mode of the robot 2, a first driving mode (a high-speed driving mode) for controlling driving of the first to sixth driving devices 251 to 256 to set maximum moving speed of the robot arm 22 to be equal to or lower than first speed and a second driving mode (a low-speed driving mode) for controlling driving of the first to sixth driving devices 251 to 256 to set the maximum moving speed of the robot arm 22 to be equal to or lower than second speed lower than the first speed.

The robot controller 5 drives the robot 2 in the first driving mode when the person is absent in the detection area S, that is, when the human detection sensor 3 outputs the human non-detection signal. Consequently, operation efficiency of the robot 2 is improved. On the other hand, the robot controller 5 drives the robot 2 in the second driving mode when the person is present in the detection area S, that is, when the human detection sensor 3 outputs the human detection signal. Consequently, safety of the person present in the detection area S can be secured.

Such a robot controller 5 is configured from, for example, a computer. The robot controller 5 includes a processor (CPU) configured to process information, a memory communicably connected to the processor, and an external interface. Various computer programs executable by the processor are saved in the memory. The processor can read and execute the various computer programs and the like stored in the memory.

Three-Dimensional Measuring Device

The three-dimensional measuring device 4 detects a posture, a position, and the like of the object W according to a phase shift method. As shown in FIG. 3, the three-dimensional measuring device 4 includes a laser emitter 41 configured to irradiate a region including the object W with the laser beam L, an image capturing device 47 configured to image the object W, on which the laser beam L is irradiated, and acquire image data, a speed detector 40 configured to detect moving speed of the robot arm 22, and a controller 48 configured to control driving of the laser emitter 41 and the image capturing device 47 and generate three-dimensional point cloud of the object W from the image data acquired by the image capturing device 47.

Among these components, the laser emitter 41 and the image capturing device 47 are respectively fixed to the fifth arm 225 of the robot 2. The laser emitter 41 is disposed to irradiate the laser beam L toward the distal end side (the end effector 24 side) of the fifth arm 225. The image capturing device 47 is disposed to face the distal end side (the end effector 24 side) of the fifth arm 225 and image a region including an irradiation range of the laser beam L.

A relation in which the end effector 24 is located on the distal end side of the fifth arm 225 is maintained even if the arms 221 to 224 and 226 other than the fifth arm 225 move. Therefore, when the laser emitter 41 and the image capturing device 47 are fixed to the fifth arm 225, the three-dimensional measuring device 4 can always emit the laser beam L to the distal end side of the end effector 24 and can image the distal end side of the end effector 24. Therefore, irrespective of a posture at the time when the robot 2 is about to grip the object W with the end effector 24, that is, a posture in which the end effector 24 is opposed to the object W, in the posture, the three-dimensional measuring device 4 can irradiate the laser beam L toward the object W and can image the object W. Therefore, the three-dimensional measuring device 4 can more surely perform three-dimensional measurement of the object W. However, the disposition of the laser emitter 41 and the image capturing device 47 is not particularly limited. For example, the laser emitter 41 and the image capturing device 47 may be fixed to the first to fourth arms 221 to 224 and the sixth arm 226.

The laser emitter 41 has a function of irradiating the laser beam L toward the object W to thereby project a predetermined projection pattern P on the object W. Such a laser emitter 41 includes a laser beam source 42 configured to emit the laser beam L, an optical system 44 including a plurality of lenses through which the laser beam L passes, and an optical scanner 45 configured to scan the laser beam L, which has passed through the optical system 44, toward the object W.

The laser beam source 42 is not particularly limited. For example, semiconductor lasers such as a vertical cavity surface emitting laser (VCSEL) and a vertical external cavity surface emitting laser (VECSEL) can be used. A wavelength of the laser beam L is not particularly limited. The wavelength of the laser beam L may be in a visible region (400 to 700 nm), may be in an invisible region (400 nm or less and 1400 nm to 1 mm), or may be in a near-infrared region (700 to 1400 nm). However, the wavelength of the laser beam L is desirably in the visible region (400 to 700 nm). In the visible region, even if the laser beam L enters the eyes of a person coexisting with the robot 2, the person can instantaneously feel glare and show a defense reaction by blinking. Therefore, by setting the wavelength of the laser beam L in the visible region, the robot system 1 is safer.

The optical system 44 is a diffusion optical system and configures a diffuser. The optical system 44 includes a collimator lens 441 configured to collimate the laser beam L emitted from the laser beam source 42 and a rod lens 442 (a lens that diffuses the laser beam L in a one-dimensional direction) configured to change the laser beam L collimated by the collimator lens 441 to a line shape extending in a direction parallel to a turning axis J explained below (a paper surface depth direction of FIG. 3).

The optical scanner 45 has a function of scanning the laser beam L changed to the line shape by the rod lens 442. Consequently, it is possible to two-dimensionally (planarly) irradiate the laser beam L. The optical scanner 45 is not particularly limited. For example, an MEMS (Micro Electro Mechanical Systems), a Galvano mirror, and a polygon mirror can be used. The optical scanner 45 also functions as a diffuser that diffuses, in a planar shape, the laser beam L having the line shape.

The optical scanner 45 in this embodiment is configured by the MEMS. As shown in FIG. 4, the optical scanner 45 includes a movable section 451, a supporting section 452 configured to support the movable section 451, a beam section 453 configured to couple the movable section 451 and the supporting section 452 and enable the movable section 451 to turn around the turning axis J with respect to the supporting section 452, a mirror 454 disposed on the front surface (the surface on the paper surface near side of FIG. 4) of the movable section 451 and configured to reflect the laser beam L, a permanent magnet 455 provided on the rear surface (the surface on the paper surface depth side of FIG. 4) of the movable section 451, and a coil 456 disposed to be opposed to the permanent magnet 455. The movable section 451, the supporting section 452, and the beam section 453 are, for example, integrally formed from a silicon substrate.

Such an optical scanner 45 is disposed such that the turning axis J substantially coincides with an extending direction of the laser beam L having the line shape. When a driving signal (an alternating voltage) is applied to the coil 456, the movable section 451 turns around the turning axis J. Consequently, the laser beam L having the line shape is scanned.

The optical scanner 45 includes a piezoresistor 457 provided in the supporting section 452. A resistance value of the piezoresistor 457 changes according to stress generated in the supporting section 452 as the movable section 451 turns around the turning axis J. Therefore, the optical scanner 45 can detect a turning angle of the movable section 451 based on a resistance value change of the piezoresistor 457. The piezoresistor 457 can be formed by doping (diffusing or injecting) impurities such as phosphorus or boron in a silicon substrate.

The laser emitter 41 is explained above. In such a laser emitter 41, as explained above, the laser beam L is two-dimensionally diffused by the optical system 44 (the diffuser) and the optical scanner 45 (the diffuser). Consequently, three-dimensional measurement of the object W explained below can be performed. Since the laser beam L is diffused and irradiated, the intensity of the laser beam L, that is, an energy amount per unit time in regions on which the laser beam L can be irradiated decreases as further away from the laser emitter 41, in other words, as the optical path length of the laser beam L increases. By adopting such a configuration, it is possible to more effectively suppress an adverse effect caused by the high-intensity laser beam L entering the eyes of the person. Therefore, the robot system 1 is safer for the person coexisting with the robot 2.

The configuration of the laser emitter 41 is not particularly limited if the laser emitter 41 can project the predetermined projection pattern P on the object W. For example, in this embodiment, the laser beam L is diffused in the line shape by the optical system 44. However, not only this, but, for example, the laser beam L may be diffused in the line shape using an MEMS or a Galvano mirror. That is, the laser beam L may be two-dimensionally scanned using two optical scanners (same as the optical scanner 45) having different diffusing directions each other. For example, the laser beam L may be two-dimensionally scanned using an MEMS of a gimbal type having a two-axis degree of freedom. These components configure the diffuser in the present disclosure.

The image capturing device 47 images a state in which the projection pattern P is projected on at least one object W. That is, the image capturing device 47 images at least one object W including the projection pattern P. As shown in FIG. 3, the image capturing device 47 is configured by, for example, a camera 471 including an imaging device 472 such as a CMOS image sensor or a CCD image sensor and a condensing lens 473.

The speed detector 40 detects moving speed of the robot arm 22 according to outputs from the encoders E included in the first to sixth driving devices 251 to 256. "Moving speed of the robot arm 22" may be moving speed in any position of the robot arm 22 but is desirably moving speed in a position where the three-dimensional measuring device 4 is disposed. In this embodiment, the three-dimensional measuring device 4 is disposed in the fifth arm 225. Therefore, in the following explanation, for convenience of explanation, it is assumed that the moving speed of the robot arm 22 is synonymous with moving speed of the fifth arm 225.

The configuration of the speed detector 40 is not particularly limited. For example, the speed detector 40 may detect the moving speed of the robot arm 22 based on a position command transmitted from the host computer 6 to the robot controller 5. For example, the speed detector 40 may include an inertial sensor disposed in the fifth arm 225 and detect the moving speed of the robot arm 22 based on inertia applied to the inertial sensor. The inertial sensor is not particularly limited. For example, it is possible to use a composite sensor including a three-axis acceleration sensor capable of detecting accelerations along respective axes of an X axis, a Y axis, and a Z axis, which are three axes orthogonal to one another, and a three-axis angular velocity sensor capable of detecting angular velocities around the axes of the X axis, the Y axis, and the Z axis.

As shown in FIG. 3, the controller 48 includes a human detection information receiver 481 configured to receive information from the human detection sensor 3, a laser emission controller 482 configured to control driving of the laser beam source 42, an optical scanning controller 483 configured to control driving of the optical scanner 45, an image capturing controller 484 configured to control driving of the image capturing device 47, a point cloud generator 485 configured to generate, based on image data acquired by the image capturing device 47, three-dimensional point cloud of the region including the object W, and a speed signal receiver 486 configured to receive a signal of the speed detector 40.

Such a controller 48 is configured from, for example, a computer. The controller 48 includes a processor (a CPU) configured to process information, a memory communicably connected to the processor, and an external interface. Various computer programs executable by the processor are saved (stored) in the memory. The processor can read and execute the various computer programs and the like stored in the memory.

The optical scanning controller 483 controls driving of the optical scanner 45 by applying a driving signal to the coil 456. The optical scanning controller 483 detects a turning angle of the movable section 451 based on a resistance value change of the piezoresistor 457. The optical scanning controller 483 drives the movable section 451 in a non-resonant manner. That is, the optical scanning controller 483 applies, to the coil 456, a driving signal having a frequency sufficiently separated from a resonant frequency of a vibration system including the movable section 451 and the beam section 453. Consequently, compared with when the movable section 451 is driven in a resonant manner, it is possible to freely control a waveform, an amplitude, a frequency, and the like of the movable section 451. However, the optical scanning controller 483 may be configured to drive the movable section 451 in a resonant manner.

The optical scanning controller 483 starts driving of the optical scanner 45, that is, a swinging motion of the movable section 451 after the speed signal receiver 486 detects according to a signal from the speed detector 40 that the moving speed of the robot arm 22 decreases to be equal to or lower than second speed V2. More specifically, as shown in FIG. 5, when the robot arm 22 moves from a present position P1 to a gripping position P2 for gripping the object W, in order to grip the object W, at least an acceleration region Q1 where the robot arm 22 is accelerated and a deceleration region Q2 where the robot arm 22 is decelerated are generated. The optical scanning controller 483 starts driving of the optical scanner 45 after the moving speed of the fifth arm 225 decreases to the second speed V2 or less in the deceleration region Q2. The second speed V2 is larger than 0 (zero) and smaller than maximum speed Vm of the robot arm 22. That is, 0<V2<Vm is satisfied.

Consequently, for example, it is possible to reduce a driving time of the optical scanner 45 compared with when the optical scanner 45 is always driven. Therefore, it is possible to achieve power saving of the robot system 1. It is possible to reduce a time required from when the robot arm 22 stops until the three-dimensional measurement of the object W is started compared with when the driving of the optical scanner 45 is started after the robot arm 22 stops. Therefore, the operation efficiency of the robot 2 is improved. The second speed V2 is not particularly limited. The second speed V2 can be set to, for example, 10 mm/s or more and 100 mm/s or less. "The robot arm 22 stops" refers to "driving of the first to sixth driving devices 251 to 256 stops". Vibration remaining after the stop (residual vibration) is not considered.

As another example, the optical scanning controller 483 may start the driving of the optical scanner 45 based on time. Specifically, the optical scanning controller 483 may start the driving of the optical scanner 45 a predetermined time before time when the robot arm 22 moves to the gripping position P2. For example, the time when the robot arm 22 moves to the gripping position P2 can be calculated based on a position command transmitted from the host computer 6. Therefore, the optical scanning controller 483 starts the driving of the optical scanner 45 immediately before the time when the robot arm 22 moves to the gripping position P2. Consequently, it is possible to reduce the driving time of the optical scanner 45 compared with when the optical scanner 45 is always driven. Therefore, it is possible to achieve power saving of the robot system 1. It is possible to reduce a time from when the robot arm 22 stops until the three-dimensional measurement of the object W is started compared with when the driving of the optical scanner 45 is started after the movement of the robot arm 22 is completed. Therefore, the operation efficiency of the robot 2 is improved. Time when the driving of the optical scanner 45 is started is not particularly limited. For example, the time when the driving of the optical scanner 45 is started is desirably one second before and more desirably 0.5 second before the robot arm 22 moves to the gripping position P2.

The laser emission controller 482 controls driving of the laser beam source 42 by applying a driving signal to the laser beam source 42. The laser emission controller 482 emits the laser beam L from the laser beam source 42 in synchronization with turning of the movable section 451 detected by the optical scanning controller 483 and forms, on the object W, for example, the projection pattern P of a stripe pattern represented by light and shade shown in FIG. 6.

The laser emission controller 482 includes, as a power mode of the laser beam L, a first power mode for emitting the laser beam L at first power and a second power mode for emitting the laser beam L at second power lower than the first power and can select these power modes. The laser emission controller 482 may further include a third power mode for emitting the laser beam L at third power lower than the second power and a fourth power mode for emitting the laser beam L at fourth power lower than the third power. That is, the number of power modes included in the laser emission controller 482 is not particularly limited.

The first power is not particularly limited. For example, the intensity of the first power immediately after emission from the laser beam source 42, that is, in a nearest place to an emission port is desirably approximately a class 2, a class 2M, or a class 3R indicated by the Japanese Industrial Standard "JIS C 6802". Consequently, it is possible to project a sufficiently bright projection pattern P on the object W. The image capturing device 47 can acquire, in a short exposure time, image data having sufficient brightness and contrast. The second power is not particularly limited. For example, the intensity of the second power immediately after emission from the laser beam source 42 is desirably equal to or lower than a class 1 indicated by the Japanese Industrial Standard "JIS C 6802". Consequently, the intensity of the laser beam L emitted in the second power mode is in a level safe for the person present in the detection area S.

The laser emission controller 482 emits the laser beam L from the laser beam source 42 after the turning of the movable section 451 is started. Preferably, the laser emission controller 482 emits the laser beam L from the laser beam source 42 after the amplitude (a turning angle around the turning axis J) of the movable section 451 increases to predetermined magnitude or more. For example, if the laser beam L is emitted in a state in which the movable section 451 is not turning and a posture of the movable section 451 is fixed, the laser beam L is continuously irradiated on the same part. If the eyes of a person are present on an optical path of the laser beam L, the laser beam L continuously enters the eyes of the person. The laser beam L is likely to affect the eyes depending on, for example, the intensity of the laser beam L. On the other hand, if the turning of the movable section 451 is started earlier than the emission of the laser beam L, the laser beam L is scanned and is not continuously irradiated on the same part. Therefore, the problem described above less easily occurs. The robot system 1 is safer. The "predetermined magnitude" is not particularly limited. For example, the "predetermined magnitude" is desirably 30° or more and more desirably 45° or more. Consequently, the effects explained above are more conspicuous.

The laser emission controller 482 stops the emission of the laser beam L from the laser beam source 42 before the turning of the movable section 451 stops. Preferably, the laser emission controller 482 emits the laser beam L from the laser beam source 42 before the amplitude (the turning angle around the turning axis J) of the movable section 451 decreases to be equal to or smaller than the predetermined magnitude. Consequently, the laser beam L can be always scanned by the optical scanner 45. Therefore, the laser beam L does not continuously enter the eyes of the person. The robot system 1 is safer.

The laser emission controller 482 may determine, based on whether the optical scanning controller 483 is applying a driving signal to the coil 456, whether the movable section 451 is turning. However, it is more desirable to determine, based on a resistance value change of the piezoresistor 457, whether the movable section 451 is turning. For example, there is a risk that, because of a failure, disconnection, or the like of the optical scanner 45, turning of the movable section 451 is not started, although the driving signal is applied to the coil 456. On the other hand, based on the resistance value change of the piezoresistor 457, since the resistance value of the piezoresistor 457 does not change unless the turning of the movable section 451 is started, it is possible to surely confirm that the movable section 451 has started turning. Further, since the resistance value of the piezoresistor 457 changes according to the amplitude (the turning angle) of the movable section 451, it is possible to easily detect the amplitude of the movable section 451 as well.

The laser emission controller 482 starts the emission of the laser beam L after detecting according to the signal from the speed detector 40 that the moving speed of the robot arm 22 decreases to be equal to or lower than first speed V1 lower than the second speed V2. As explained above, the driving of the optical scanner 45 is started after the moving speed of the robot arm 22 decreases to be equal to or lower than the second speed V2. Therefore, by emitting the laser beam L after the moving speed of the robot arm 22 decreases to the first speed V1 lower than the second speed V2, it is possible to more surely emit the laser beam L in the state in which the movable section 451 is turning. Therefore, the robot system 1 is safer. The first speed V1 is not particularly limited. For example, the first speed V1 is desirably 0.75 or less of the second speed V2 and more desirably 0.5 or less of the second moving speed V2. Consequently, it is possible to sufficiently shift time when the moving speed of the robot arm 22 is decelerated to the second speed V2 and time when the moving speed of the robot arm 22 is decelerated to the first speed V1. It is possible to more surely bring the movable section 451 into a rotating state by the time when the moving speed of the robot arm 22 decreases to the first speed V1.

In particular, the laser emission controller 482 desirably starts the emission of the laser beam L after detecting according to the signal from the speed detector 40 that the robot arm 22 is in a stopped state. Consequently, it is possible to effectively prevent the laser beam L from being emitted toward an unintended direction.

The image capturing controller 484 controls driving of the image capturing device 47 (the camera 471). The projection pattern P is projected four times while being shifted by $\pi/2$ at a time. Every time the projection pattern P is projected, the image capturing controller 484 images, with the image capturing device 47, the object W on which the projection pattern P is projected. However, the number of times of projection of the projection pattern P is not particularly limited and only has to be the number of times with which a phase can be calculated from an imaging result. The image capturing controller 484 may perform the same projection and imaging using a pattern having a large pitch or a pattern having a small pitch and perform phase connection. A measurement range and resolution can be improved as types of pitches are increased. However, since the number of times of imaging increases, a time required for acquiring image data increases and the operation efficiency of the robot 2 is deteriorated. Therefore, the number of times of projection of the projection pattern P only has to be set as appropriate according to a balance of accuracy and a measurement range of the three-dimensional measurement and the operation efficiency of the robot 2.

The point cloud generator 485 generates, using a phase shift method, three-dimensional point cloud of the region including the object W from a plurality of image data acquired by the image capturing device 47. The three-dimensional point cloud generated by the point cloud generator 485 is transmitted to the host computer 6.

The host computer 6 includes a calculator 61 configured to calculate, based on the three-dimensional point cloud received from the point cloud generator 485, three-dimensional information including a posture, a position (a space coordinate), and the like of the object W. For example, information concerning the shape of the object W is stored in the calculator 61. It is possible to calculate a posture and a position of the object W by matching the three-dimensional point cloud and the shape of the object W. However, not only this, but the shape of the object W may be acquired from the three-dimensional point cloud.

The host computer 6 generates a position command for the robot 2 from the calculated three-dimensional information of the object W and transmits the generated position command to the robot controller 5. The robot controller 5 respectively independently drives the first to sixth driving devices 251 to 256 based on the position command received from the host computer 6 and moves the first to sixth arms 221 to 226 to instructed positions.

In this embodiment, the host computer 6 includes the calculator 61. However, not only this, but, for example, the three-dimensional measuring device 4 or the robot controller 5 may include the calculator 61 or another device may include the calculator 61.

The configuration of the robot system 1 is explained above. A control method for the robot system 1 is explained below. First, a case is explained in which a person is absent in the detection area S, that is, the human detection information receiver 481 is receiving a human non-detection signal from the human detection sensor 3. In this case, since the person is absent in the detection area S, it is almost unlikely that the high-intensity laser beam L enters the eyes of the person. Therefore, when the three-dimensional measurement of the object W is performed, the laser emission controller 482 emits the laser beam L in the first power mode. When the person is absent in the detection area S, it is almost unlikely that the robot 2 and the person collide with each other. Therefore, the robot controller 5 drives the first to sixth arms 221 to 226 in the first driving mode.

Subsequently, a case is explained in which a person is present in the detection area S, that is, the human detection information receiver 481 is receiving a human detection signal from the human detection sensor 3. In this case, since the person is present in the detection area S, the laser beam L is likely to enter the eyes of the person. Therefore, when the three-dimensional measurement of the object W is performed, the laser emission controller 482 emits the laser beam L in the second power mode having lower intensity than the first power mode. When the person is present in the detection area S, the robot 2 and the person are likely to collide with each other. Therefore, the robot controller 5 drives the first to sixth arms 221 to 226 in the second driving mode in which maximum moving speed is lower than the maximum moving speed in the first driving mode.

In this way, when the person is absent in the detection area S, the laser beam L having high intensity compared with when the person is present in the detection area S is used. Consequently, it is possible to project a brighter projection pattern P on the object W and more accurately perform the three-dimensional measurement of the object W. Since the projection pattern P is bright, it is possible to reduce an exposure time (in other words, increase shutter speed) of the camera 471. It is possible to reduce a time required for the three-dimensional measurement of the object W. Therefore, the operation efficiency of the robot 2 is improved. On the other hand, when the person is present in the detection area S, the laser beam L having low intensity compared with when the person is absent in the detection area S is used. Consequently, the power of the laser beam L decreases to a level that is safe even if the laser beam L enters the eyes of the person present in the detection area S. Therefore, it is possible to secure safety of the person.

The exposure time of the camera 471 in this case is not particularly limited. For example, the exposure time may be the same exposure time as the exposure time at the time when the person is absent in the detection area S or may be an exposure time longer than the exposure time at the time when the person is absent in the detection area S. When the person is present in the detection area S, the projection pattern P is dark compared with when the person is absent in the detection area S. Therefore, in the former case, accuracy of the three-dimensional measurement of the object W is deteriorated compared with when the person is absent in the detection area S. However, a time required for the three-dimensional measurement of the object W is substantially equal. On the other hand, in the latter case, a substantially equal exposure amount can be set compared with when the person is absent in the detection area S. Therefore, the accuracy of the three-dimensional measurement of the object W is substantially equal. However, the time required for the three-dimensional measurement of the object W increases. Therefore, the exposure time of the camera 471 only has to be set as appropriate considering a balance between the accuracy of the three-dimensional measurement of the object W and the operation efficiency of the robot 2.

The control method for the robot system 1 is not limited to the above. For example, when the person is present in the detection area S, the laser emission controller 482 may stop the emission of the laser beam L. As explained above, when the laser emission controller 482 includes the third power mode, the fourth power mode, and the like, if the person enters the detection area S, the laser emission controller 482 may switch the power mode of the laser beam L to the third and fourth power modes. When the person is present in the detection area S, the robot controller 5 may respectively stop the driving of the first to sixth arms 221 to 226. Consequently, the robot system 1 is safer for the person present in the detection area S.

In the configuration explained above, the power of the laser beam L is changed according to whether the person is present in the detection area S. However, a driving mode of the optical scanner 45 may be changed instead of or together with the power of the laser beam L. For example, the optical scanning controller 483 may include, as the driving mode of the optical scanner 45, a first turning mode in which a turning angle around the turning axis J of the movable section 451 is a first angle $\theta 1$ and a second turning mode in which the turning angle around the turning axis J of the movable section 451 is a second angle $\theta 2$ larger than the first angle $\theta 1$ and may be able to select these turning modes. The first turning mode and the second turning mode can be easily switched by, for example, changing the intensity (the amplitude) of the driving signal applied to the coil 456.

When the person is absent in the detection area S, the optical scanning controller 483 drives the optical scanner 45 in the first turning mode. Consequently, a scanning range of the laser beam L is narrowed compared with when the optical scanner 45 is driven in the second turning mode. The laser beam L can be efficiently irradiated on the object W. Therefore, it is possible to more accurately perform the three-dimensional measurement of the object W. On the other hand, when the person is present in the detection area S, the optical scanning controller 483 drives the optical scanner 45 in the second turning mode. Consequently, the scanning range of the laser beam L is widened compared with when the optical scanner 45 is driven in the first turning mode. Therefore, even when the eyes of the person are present in the scanning range of the laser beam L, an energy amount of the laser beam L entering the eyes decreases. Therefore, the robot system 1 is safer for the person coexisting with the robot 2.

As the driving mode of the optical scanner 45, the optical scanning controller 483 may include a first frequency mode in which a frequency of a driving signal is a first frequency f1 and a second frequency mode in which the frequency of the driving signal is a second frequency f2 higher than the first frequency f1 and may be able to select these frequency modes. When the person is absent in the detection area S, the optical scanning controller 483 drives the optical scanner 45 in the first frequency mode. Consequently, scanning speed of the laser beam L decreases compared with when the optical scanner 45 is driven in the second frequency mode. It is possible to efficiently irradiate the object W with the laser beam L. Therefore, it is possible to more accurately perform the three-dimensional measurement of the object W. On the other hand, when the person is present in the detection area S, the optical scanning controller 483 drives the optical scanner 45 in the second frequency mode. Consequently, the scanning speed of the laser beam L increases compared with when the optical scanner 45 is driven in the first frequency mode. Therefore, even when the eyes of the person are present in the scanning range of the laser beam L, an energy amount of the laser beam L entering the eyes decreases. Therefore, the robot system 1 is safer for the person coexisting with the robot 2.

The robot system 1 explained above is the robot system including, as explained above, the robot 2 including the robot arm 22, the laser emitter 41 disposed in the robot arm 22 and configured to irradiate, on the region including the object, the laser beam L diffused by the optical system 44 and the optical scanner 45 functioning as the diffuser, the robot controller 5 configured to control the driving of the robot arm 22, the laser emission controller 482 configured to control the driving of the laser emitter 41, and the speed signal receiver 486 configured to receive the signal indicating the moving speed of the robot arm 22. The laser emission controller 482 starts the emission of the laser beam L after the speed signal receiver 486 receives the signal indicating that the moving speed of the robot arm 22 decreases to be equal to or lower than the first speed V1. By diffusing the laser beam L with the optical system 44 and the optical scanner 45 in this way, the intensity of the laser beam L (an irradiation energy amount per unit time in regions on which the laser beam L can be irradiated) decreases as further away from the laser emitter 41, in other words, as the optical path length of the laser beam L increases. Therefore, it is possible to more effectively prevent the high-intensity laser beam L from entering the eyes of the person. The robot system 1 is safe for the person coexisting with the robot 2. Power saving driving of the robot system 1 is possible compared with when the laser beam L is always emitted. Compared with when the laser beam L is emitted after the robot arm 22 stops, it is possible to reduce the time from when the robot arm 22 stops until the three-dimensional measurement of the object W is started.

As explained above, the three-dimensional measuring device 4 that performs the three-dimensional measurement of the object W using the laser beam L includes the laser emitter 41 disposed in the robot arm 22 (the movable section) of the robot 2 and configured to irradiate the region including the object W with the laser beam L, the laser emission controller 482 configured to control the driving of the laser emitter 41, the image capturing device 47 configured to image the object W, on which the laser beam L is irradiated, and acquire image data, and the point cloud generator 485 configured to generate, based on the image data, three-dimensional point cloud of the region including the object W. The laser emitter 41 includes the laser beam source 42 and the optical system 44 and the optical scanner 45 functioning as the diffuser that diffuses the laser beam L emitted from the laser beam source 42. By diffusing the laser beam L with the diffuser in this way, the intensity of the laser beam L decreases as further away from the laser emitter 41, in other words, as the optical path length of the laser beam L increases. Therefore, it is possible to effectively prevent the high-intensity laser beam L from entering the eyes of the person. The robot system 1 is safe for the person coexisting with the robot 2.

The "diffuse" means that, for example, the irradiation range of the laser beam L expands along an emitting direction of the laser beam L while the optical axis of the laser beam L is fixed or the irradiation range of the laser beam L expands along the emitting direction of the laser beam L by changing the optical axis of the laser beam L.

As explained above, the diffuser includes the mirror 454 configured to scan the laser beam L with a swinging motion. Consequently, the configuration of the diffuser is simplified. As explained above, the diffuser includes the rod lens 442 functioning as the lens that diffuses the laser beam L. Consequently, the configuration of the diffuser is simplified.

As explained above, the laser emission controller 482 starts the emission of the laser beam L after the mirror 454 starts the swinging motion. Consequently, it is possible to prevent the laser beam L from being continuously irradiated on the same part. Therefore, the robot system 1 is safer. As explained above, the laser emission controller 482 stops the emission of the laser beam L before the mirror 454 stops the swinging motion. Consequently, it is possible to prevent the laser beam L from being continuously irradiated on the same part. Therefore, the robot system 1 is safer.

As explained above, the three-dimensional measuring device 4 includes the speed detector 40 configured to detect moving speed of the robot arm 22. The laser emission controller 482 starts the emission of the laser beam L after detecting according to the signal from the speed detector 40 that the moving speed of the robot arm 22 decreases to be equal to or lower than the first speed V1. Consequently, the power saving driving of the robot system 1 is possible compared with when the laser beam L is always emitted. It is possible to reduce the time from when the robot arm 22 stops until the three-dimensional measurement of the object W is started compared with when the laser beam L is emitted after the robot arm 22 stops.

As explained above, the laser emission controller 482 may start the emission of the laser beam L after detecting according to the signal from the speed detector 40 that the robot arm 22 is in the stopped state. Consequently, the emitting direction of the laser beam L is kept fixed and the irradiation range is narrowed. Therefore, the robot system 1 is safer.

As explained above, the laser emission controller 482 starts the swinging motion of the mirror 454 after detecting according to the signal from the speed detector 40 that the moving speed of the robot arm 22 decreases to be equal to or lower than the second speed V2 higher than the first speed V1. Consequently, the power saving driving of the robot system 1 is possible compared with when the mirror 454 is always swung. It is possible to reduce the time from when the robot arm 22 stops until the three-dimensional measurement of the object W is started compared with when the mirror 454 is swung after the robot arm 22 stops.

As explained above, the controller 48 that controls the laser emitter 41 disposed in the robot arm 22 and configured to irradiate, on the region including the object W, the laser beam L diffused by the diffuser includes the laser emission controller 482 configured to control the driving of the laser emitter 41 and the speed signal receiver 486 configured to receive the signal indicating the moving speed of the robot arm 22. The laser emission controller 482 starts the emission of the laser beam L after the speed signal receiver 486 receives the signal indicating that the moving speed of the robot arm 22 decreases to be equal to or lower than the first speed V1. By diffusing the laser beam L with the diffuser, the intensity of the laser beam L (the irradiation energy amount per unit time in the regions on which the laser beam L can be irradiated) decreases as further away from the laser emitter 41, in other words, as the optical path length of the laser beam L increases. Therefore, it is possible to effectively prevent the high-intensity laser beam L from entering the eyes of the person. The robot system 1 is safe for the person coexisting with the robot 2. The power saving driving of the robot system 1 is possible compared with when the laser beam L is always emitted. It is possible to reduce the time from when the robot arm 22 stops until the three-dimensional measurement of the object W is started compared with when the laser beam L is emitted after the robot arm 22 stops.

As explained above, the diffuser includes the mirror 454 configured to scan the laser beam L with the swinging motion. The laser emission controller 482 emits the laser beam L in a state in which the mirror 454 is swinging. Consequently, it is possible to prevent the laser beam L from being continuously irradiated on the same part. Therefore, the robot system 1 is safer.

The laser emission controller 482 starts the swinging motion of the mirror 454 after the speed signal receiver 486 receives the signal indicating that the moving speed of the robot arm 22 decreases to be equal to or lower than the second speed V2 higher than the first speed V1. Consequently, the power saving driving of the robot system 1 is possible compared with when the mirror 454 is always swung. It is possible to reduce the time from when the robot arm 22 stops until the three-dimensional measurement of the object W is started compared with when the mirror 454 is swung after the robot arm 22 stops.

Second Embodiment

Figure 7:
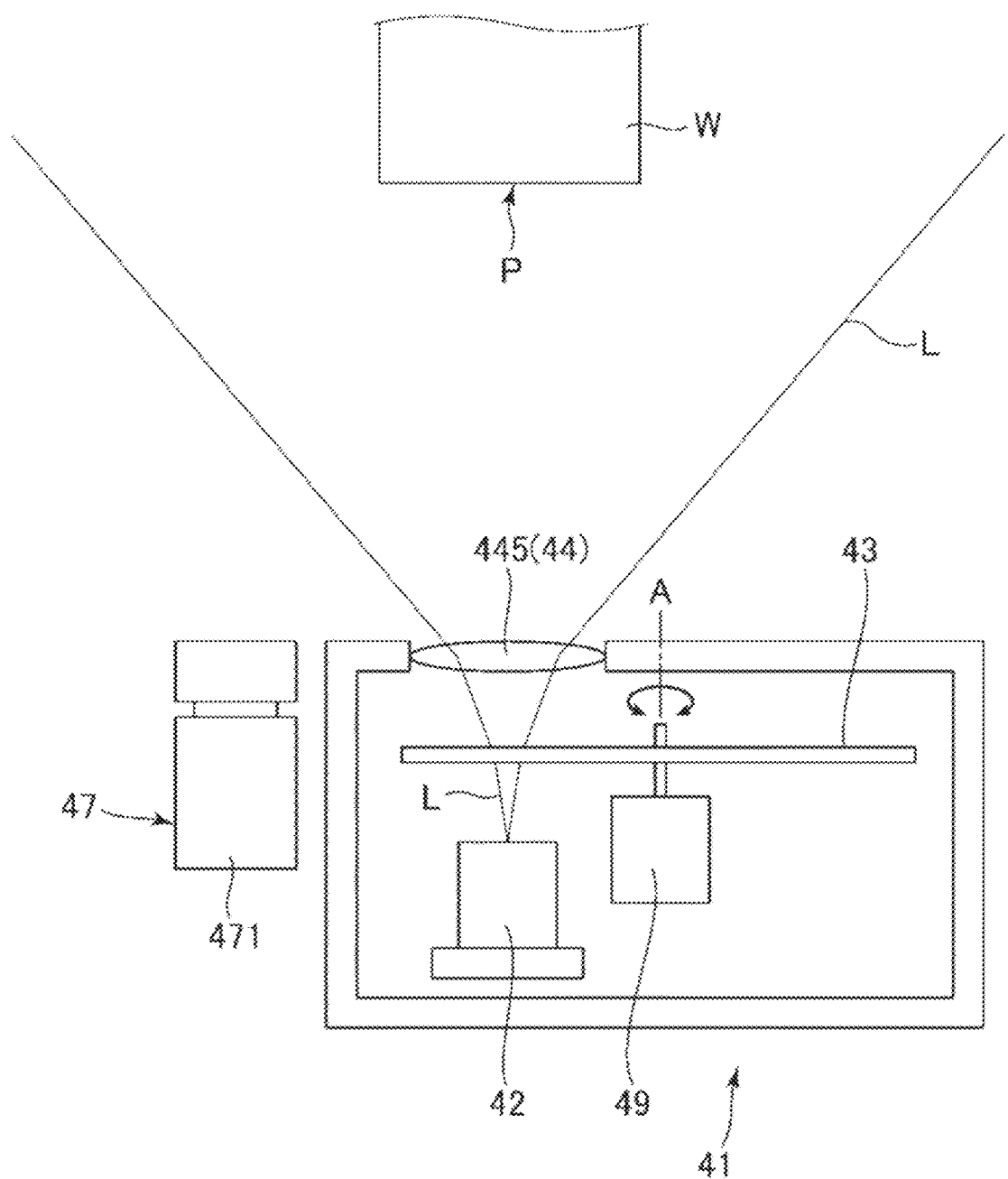
FIG. 7 is a diagram showing an overall configuration of a laser emitter included in a robot system according to a second embodiment of the present disclosure.
Figure 8:
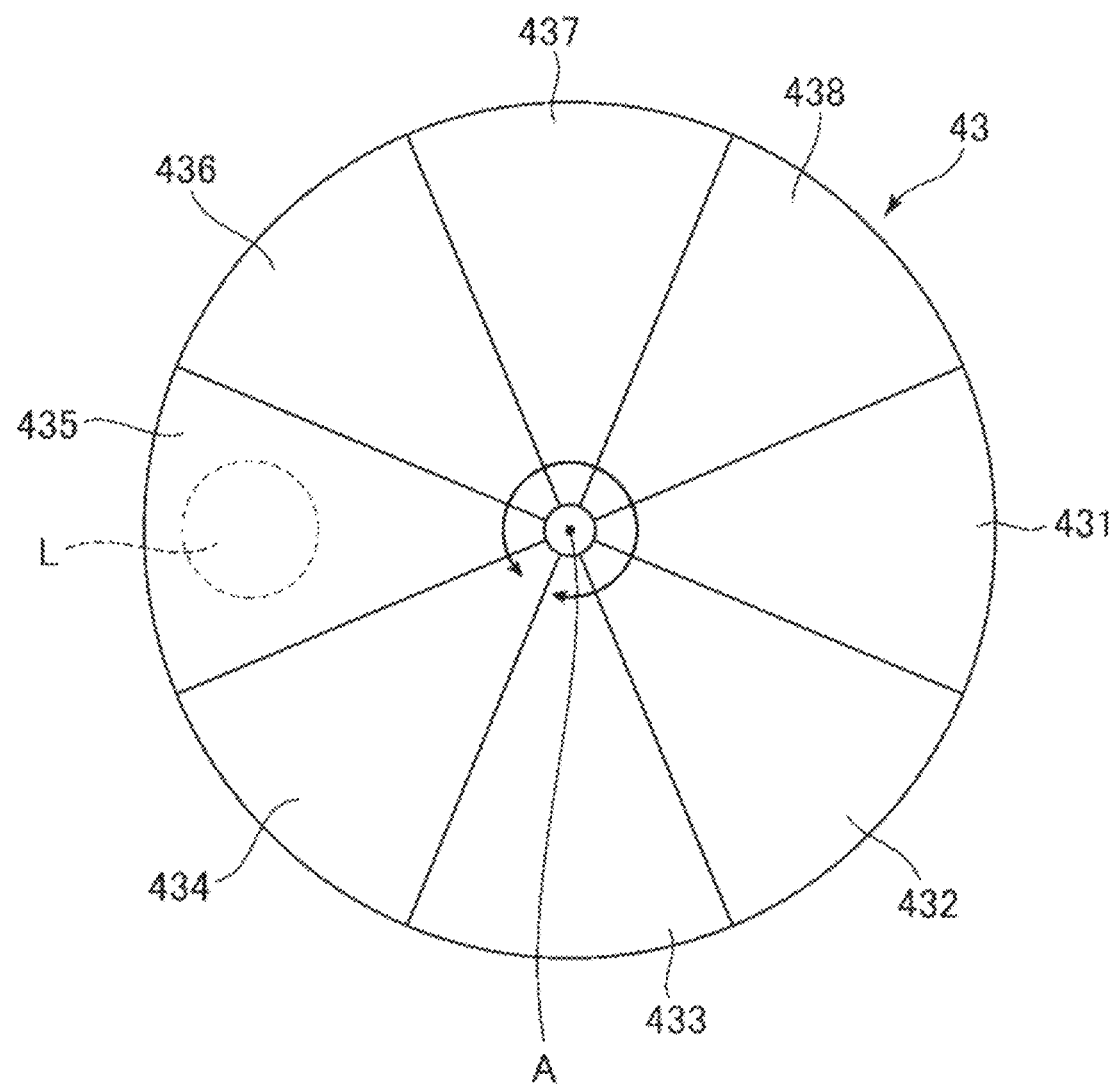
FIG. 8 is a plan view showing a diffractive optical element included in the laser emitter shown in FIG. 7.

FIG. 7 is a diagram showing an overall configuration of a laser emitter included in a robot system according to a second embodiment of the present disclosure. FIG. 8 is a plan view showing a diffractive optical element included in the laser emitter shown in FIG. 7.

In the following explanation, differences from the first embodiment are mainly explained concerning the robot system in the second embodiment. Concerning similarities, the explanation is omitted. The robot system 1 in the second embodiment is substantially the same as the robot system 1 in the first embodiment except that the configuration of the laser emitter is different. In FIGS. 7 and 8, the same components as the components in the first embodiment are denoted by the same reference numerals and signs.

As shown in FIG. 7, the laser emitter 41 in this embodiment includes the laser beam source 42 configured to emit the laser beam L, the optical system 44 including a projection lens 445, a diffractive optical element 43 located between the laser beam source 42 and the projection lens 445, and an actuator 49 configured to rotate the diffractive optical element 43 around a center axis A. As shown in FIG. 8, the diffractive optical element 43 includes diffraction gratings 431 to 438 of eight patterns disposed around the center axis A. Predetermined diffraction gratings 431 to 438 can be located on an optical path of the laser beam L by rotating the diffractive optical element 43 around the center axis A. Although not shown in FIG. 8, the diffraction gratings 431 to 434 are formed in a stripe shape in which a phase of a projection pattern on a projection surface shifts by π/2 at a time. The diffraction gratings 435 to 438 are formed in a stripe shape in which a phase of a projection pattern on the projection surface shifts by π/2 at a time. A pitch of the projection pattern on the projection surface is a double of a pitch of a projection pattern of the diffraction gratings 431 to 434.

In the laser emitter 41 having such a configuration, by locating the diffraction gratings 431 to 438 on the optical path of the laser beam L in order, it is possible to project eight projection patterns P on the object W in order.

In such a second embodiment, the laser emitter 41 includes the diffractive optical element 43 functioning as the diffuser that diffuses the laser beam L. By diffusing the laser beam L in this way, the intensity of the laser beam L decreases as further away from the laser emitter 41. Therefore, the three-dimensional measuring device 4 is safer.

The three-dimensional measuring device, the controller, and the robot system according to the present disclosure are explained above based on the illustrated embodiments. However, the present disclosure is not limited to this. The components of the sections can be replaced with any components having the same functions. Any other components may be added to the present disclosure.

What is claimed is:

1. A three-dimensional measuring device that performs three-dimensional measurement of an object using a laser beam, the three-dimensional measuring device comprising:
a laser emitter disposed in a movable section of a robot and configured to irradiate a region including the object with the laser beam;
a laser emission controller configured to control driving of the laser emitter;
an image capturing device configured to image the object, on which the laser beam is irradiated, and acquire image data; and
a point cloud generator configured to generate, based on the image data, three-dimensional point cloud of the region including the object, wherein
the laser emitter includes:
a laser beam source; and
a diffuser configured to diffuse the laser beam emitted from the laser beam source,
the three-dimensional measuring device further comprising a mirror configured to scan the laser beam with a swinging motion,
the three-dimensional measuring device further comprising a speed detector configured to detect moving speed of the movable section, wherein the laser emission controller starts the emission of the laser beam after detecting according to a signal from the speed detector that the moving speed of the movable section decreases to be equal to or lower than first speed.

2. The three-dimensional measuring device according to claim 1, wherein the laser emission controller starts the emission of the laser beam after the mirror starts the swinging motion.

3. The three-dimensional measuring device according to claim 1, wherein the laser emission controller stops the emission of the laser beam before the mirror stops the swinging motion.

4. The three-dimensional measuring device according to claim 1, wherein the laser emission controller starts the emission of the laser beam after detecting according to the signal from the speed detector that the movable section is in a stopped state.

5. The three-dimensional measuring device according to claim 1, wherein the laser emission controller starts the swinging motion of the mirror after detecting according to the signal from the speed detector that moving speed of the movable section decreases to be equal to or lower than second speed higher than the first speed.

6. The three-dimensional measuring device according to claim 1, wherein the diffuser includes a lens configured to diffuse the laser beam.

7. The three-dimensional measuring device according to claim 1, wherein the diffuser includes a diffractive optical element configured to diffuse the laser beam.

8. A controller that controls a laser emitter disposed in a robot arm and configured to irradiate a region including an object with a laser beam diffused by a diffuser, the controller comprising:
   an laser emission controller configured to control driving of the laser emitter; and
   a speed signal receiver configured to receive a signal indicating moving speed of the robot arm, wherein
   the laser emission controller starts emission of the laser beam after the speed signal receiver receives a signal indicating that the moving speed decreases to be equal to or lower than first speed.

9. The controller according to claim 8, wherein
   the diffuser includes a mirror configured to scan the laser beam with a swinging motion, and
   the laser emission controller emits the laser beam in a state in which the mirror is swinging.

10. The controller according to claim 9, wherein the laser emission controller starts the swinging motion of the mirror after the speed signal receiver receives a signal indicating that the moving speed decreases to be equal to or lower than second speed higher than the first speed.

11. A robot system comprising:
   a robot including a robot arm;
   a laser emitter disposed in the robot arm and configured to irradiate a region including an object with a laser beam diffused by a diffuser;
   a robot controller configured to control driving of the robot arm;
   a laser emission controller configured to control driving of the laser emitter; and
   a speed signal receiver configured to receive a signal indicating moving speed of the robot arm, wherein
   the laser emission controller starts emission of the laser beam after the speed signal receiver receives a signal indicating that the moving speed decreases to be equal to or lower than first speed.

12. The robot system according to claim 11, wherein
   the diffuser includes a mirror configured to scan the laser beam with a swinging motion, and
   the laser emission controller emits the laser beam in a state in which the mirror is swinging.

13. The robot system according to claim 12, wherein the laser emission controller starts the swinging motion of the mirror after the speed signal receiver receives a signal indicating that the moving speed decreases to be equal to or lower than second speed higher than the first speed.

* * * * *